Figure 1:
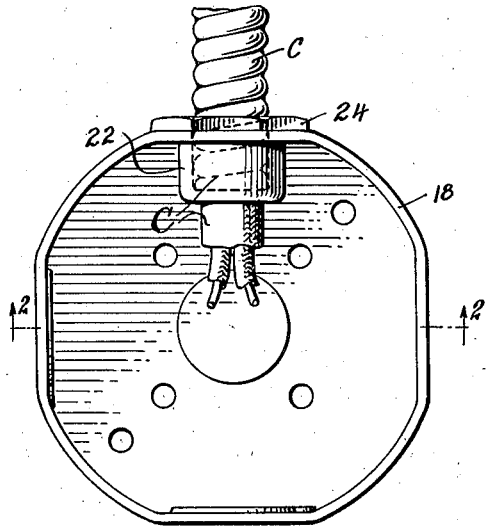

July 27, 1926.

H. L. STRONGSON

CABLE BOX AND CONNECTER

Filed Dec. 4, 1922   3 Sheets-Sheet 1

1,594,220

Inventor
Herman L. Strongson
By Attorneys
Bohleber & Ledbetter

July 27, 1926.
H. L. STRONGSON
CABLE BOX AND CONNECTER
Filed Dec. 4, 1922      3 Sheets-Sheet 2
1,594,220
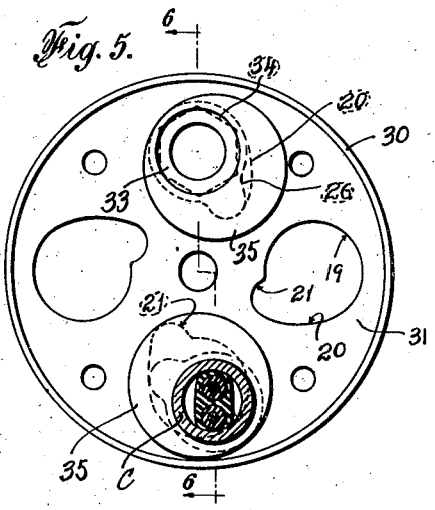
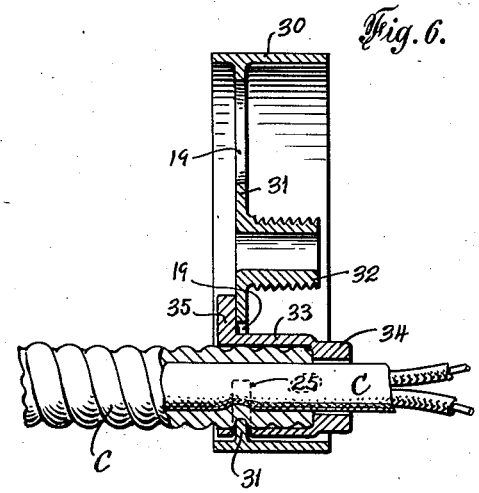
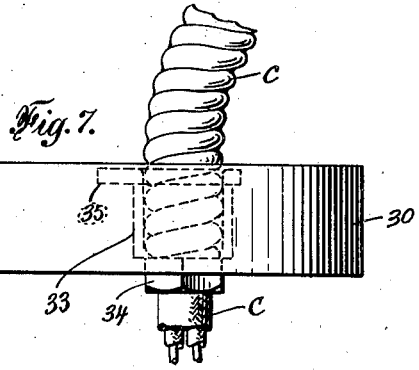
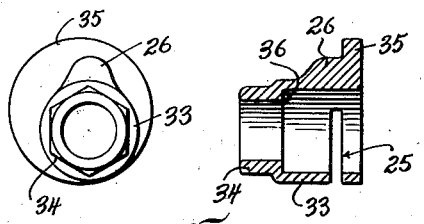
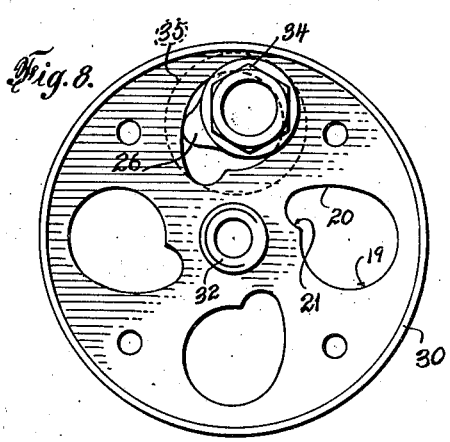
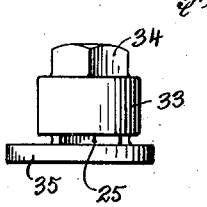
Inventor
Herman L. Strongson
By Attorneys

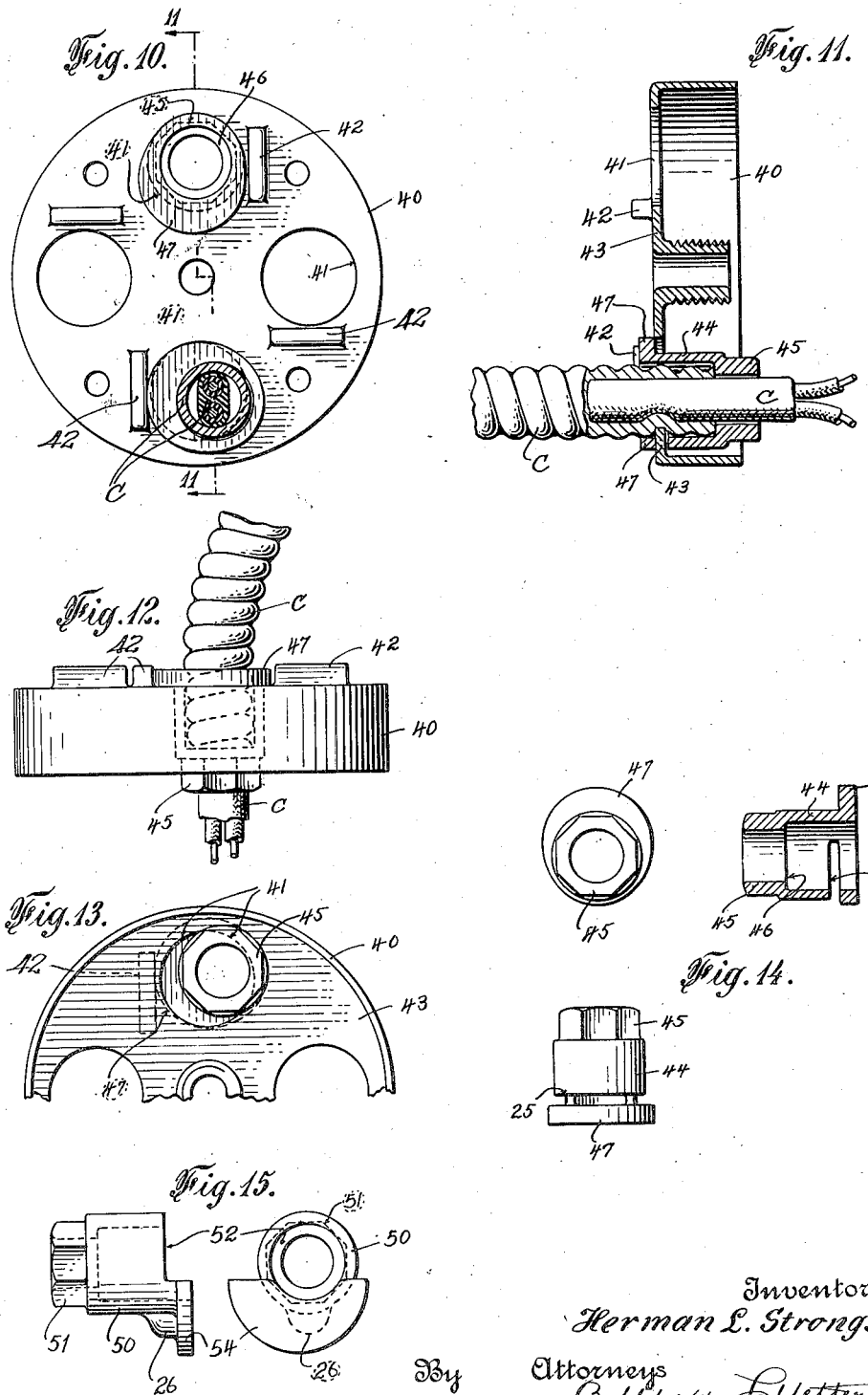

Patented July 27, 1926.

1,594,220

UNITED STATES PATENT OFFICE.

HERMAN L. STRONGSON, OF BROOKLYN, NEW YORK, ASSIGNOR, BY MESNE ASSIGNMENTS, TO THE THOMAS & BETTS CO., OF ELIZABETH, NEW JERSEY, A CORPORATION OF NEW JERSEY.

CABLE BOX AND CONNECTER.

Application filed December 4, 1922. Serial No. 604,677.

This invention relates to cable boxes and box connecting means used in electrical installations in anchoring cable and conduits to boxes affording wiring outlets. More particularly it relates to such improvements in devices of this art as simplifies the structure thereof, reduces the cost of manufacture, and improves the product.

An object is to produce cable and box connecting means, whether cast material or steel, which embody cable and conduit anchoring facilities with little or no machine work or assembly operations necessary in the manufacture thereof; and it is an object to produce cable or conduit connecters useful with such boxes which connecters are capable of being manufactured at low cost by reason of the fact that, similarly, little or no machine work is required on the connecters after once they are cast in the foundry. Likewise it is an object to produce these cable and conduit connecters in simple one piece structures.

A feature of this connecter resides in its capacity to interlock itself in a box hole without screws fastened into the box and to establish good electrical contact directly between the armored cable and said box, and this is brought about by reason of the fact that the cable is frictionally pressed against the box hole by operation of the connecter; and this direct contact is effective for both the electrical and mechanical connections between the box and cable and between the box and connecter.

A further purpose of the invention is to produce a cable connecter which anchors itself in a box hole and simultaneously secures a cable therein by action of a single operating means and which is also distinguished by reason of the fact that no direct screw threaded connection is made in or to the box and thus threaded screw holes in the box are avoided. This purpose is accomplished by producing a connecter suitable in size to fit into or through the box hole, the connecter being so constructed that a portion of the box hole edge is exposed directly to the cable, and the connecter interlocks and anchors itself in the box against longitudinal displacement by reason of the fact that a portion of the box hole edge seats into and between spaced abutment anchorage means included in the connecter. The single operating means simultaneously forces the cable against the exposed box hole edge and causes said edge to enter and remain between the spaced abutments to grip the cable between the connecter and said exposed box hole edge.

The accompanying drawings illustrate exemplary embodiments of my improved outlet and cable boxes and cable connecters, serving to explain the principles of the inventions the construction and arrangement of which may be adapted to various modified forms to better suit the needs of manufacture and the varying uses of the trade.

In Sheet 1 there is illustrated an improved cable connecter consisting of a one piece structure which is shown in combination with an outlet box.

Figure 2:
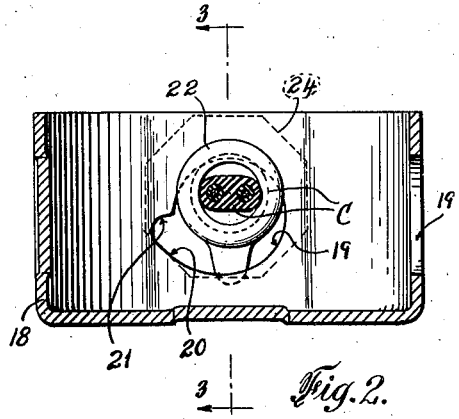
Figure 3:
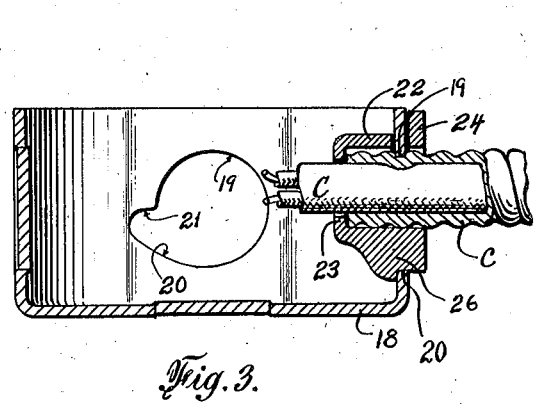
Figure 4:
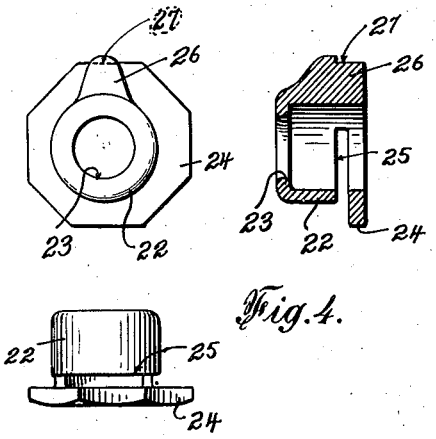

Figure 1 illustrates a top view looking into the outlet box, with a connecter locked in the box anchoring a cable thereto; and Figure 2 illustrates a sectional view taken on the line 2—2 of Figure 1. Figure 3 is a sectional view taken on the line 3—3 of Figure 2. Figure 4 is a cluster view, showing three projections of the said connecter, illustrating it in end and side positions, and in section.

The foregoing combined outlet box and cable connecter are especially adapted for use in connection with joining cables to outlet boxes where the said cables enter the box from the side; and this connecter is designed to be locked to the outlet box by the use of a wrench applied to the outer end of the cable connecter whereupon the wrench or other suitable tool forcibly rotates the connecter thereby simultaneously clamping the cable and locking the connecter to the box.

In Sheet 2, I have illustrated an improved and slightly modified form of combined box and cable connecter, the said parts consisting of simple one piece structures.

Figure 5 shows a back side or rear view of the said cable box with one flexible conduit anchored thereto; and at the top of this view a connecter without cable is shown in unlocked position. Figure 6 illustrates a cross sectional view taken on the line 6—6 of Figure 5 showing how the sleeve connecter simultaneously clamps the cable therein and locks itself to the cable box. Figure 7 shows the cable box in side elevation, with a cable and connecter locked therein, the connecter appearing in dotted lines excepting that the wrench-head end thereof projects far enough below the box rim for the reception of a wrench by which the connecter is forcibly turned to lock it and the cable to the box. Figure 8 illustrates a front view of the cable box with one connecter loosely disposed therein without a cable, and in partly rotated position. Figure 9 shows a cluster view, consisting of three projections, of the connecter removed from the box, illustrating an end view, a side view and a sectional view thereof.

In Sheet 3, I have illustrated another form of my invention in cable boxes and connecters, Figure 10 showing a back or rear view of the cable box, and showing at the top thereof a connecter loosely slipped into position ready to be forcibly turned for locking purposes; and in the lower portion of this view a connecter and cable are shown in locked position. Figure 11 is a cross sectional view taken on the line 11—11 of Figure 10. Figure 12 is a side elevation of Figure 10. Figure 13 is a half front or face view of the combined box and connecter. Figure 14 is a cluster view, consisting of three projections, of the said connecter showing it in end and side views, and in section.

Figure 15 illustrates a side elevation and end projection of a cable connecter similar to those hereinbefore mentioned, but possessing an improved design and construction which enables it to be manufactured by casting or stamping whereby machine work is practically eliminated thus making for extremely low-cost in production.

The foregoing drawings show improved construction for cable boxes and connecters specially devised to receive the cable from both the rear and side, and my connecter is useful in either box. The connecter is simultaneously anchored to the box and clamped to the cable by forcibly turning the connecter with a wrench which quickly and positively effects the locking action as will be described.

Referring first to the outlet box and connecter illustrated on Sheet 1, there is shown a box 18, similar in many resepcts to standard outlet steel boxes now on the market, differing only in respect to the knock-outs thereof which are improved to form a new combination for the purpose of better receiving and locking with and to my improved one piece connecter. Referring to Figure 3 for the shape and design of the knock-out hole in the wall of this outlet box, it is observed that the said knock-out consists of a punched hole mainly formed with an arcuate edge 19 which tends to run off at a tangent curve forming a cam edge 20, and which edge then drops back on a line substantially radial with the axis of the hole to form a stop or shoulder 21. Thus my improved knock-out opening forms an internal cam in the wall of the cable box and primarily consists in the addition of the cam edge 20 and shoulder 21 to the standard round hole now universally used in steel outlet boxes.

The cable and conduit connecter used with this steel outlet box is made in the form of a sleeve and consists of one part, which is preferably made of cast iron, there being little machining or finishing work required after the said connecter is cast in the foundry; and this sleeve connecter receives the end of the cable C, the connecter and cable being disposed in the improved knock-out 20, whereupon the said connecter is given a rotary motion by a wrench or other suitable tool, thereby simultaneously securing the cable and connecter within the knock-out hole 20. This connecter, as aforesaid, consists of a sleeve portion 22, and on the inner end there is formed a shoulder 23; and on the other end of this sleeve a wrench-head 24 is provided by which the sleeve connecter is gripped and turned by a wrench. A box hole edge entry slot 25 is made in the sleeve, preferably adjacent the wrench head 24, and extends a substantial distance through the cylindrical body 22. A cam-follower or sleeve moving projection is protruded on the sleeve, substantially parallel to the axis thereof, and slides against the box hole edge 20 of the steel outlet box; and this projection 26 is provided with a shallow shoulder or abutment notch 27 which fits over the box hole edge, thus anchoring the connecter in the knock-out opening 20. The sleeve 22 is cylindrical in form, while the cam-follower 26 preferably tapers upwardly from the shoulder 23 to the wall of the wrench head 24.

The design of this connecter, as described in the foregoing paragraph, is such that it can be readily cast and thereafter the slot 25, if not cast within the connecter, is machined or cut part way through the sleeve. This connecter is quickly assembled in the box, and locks or clamps a cable therein by placing the cable in the sleeve with the cable end resting against the shoulder 23, and thereupon the cable and connecter are inserted into the box-hole 20 by sliding the cam-follower 26 alongside the stop 21, thus admitting the connecter into the knock-out opening; and then a wrench is applied to the connecter head 24, turning the said connecter which causes the abutment notch 27 and cam follower 26 to follow along the cam edge 20 of the box 18 steadily and forcibly causing the connecter to travel laterally or radially and relatively with respect to the axis of the knock-out opening 19, until the edge 19 of the steel box is moved inwardly through the slot 25 thus gripping against the cable or conduit.

The camming and wedging action thus executed by the rotation of the sleeve within the improved knock-out opening simultaneously anchors the connecter within the box and grips the cable in the connecter against the exposed box hole edge because, as observed, particularly in Figure 3, the thin edge 19 of the steel box is very forcibly pinched into the wall of the cable, thus jamming the said cable against the inner wall of the sleeve and at the same time causing the slotted connecter wall 22 to overlap and engage and abut both the inside and outside surface of the box wall which holds the connecter against longitudinal displacement in the box hole and simultaneously grips the cable against the exposed box hole edge.

It is to be observed that the box hole shoulder 21 formed in the wall of this outlet box acts as a stop against which the cam follower 26 comes to rest, thereby preventing the connecter 22 from being rotated in the wrong direction. This construction forces the mechanic, or one installing the equipment, to turn the connecter in the right direction.

Pressed steel electrical outlet boxes of standard type may be manufactured with my improved knock-out openings, by merely changing the knock-out punching tools, thus forming the new shaped knock-out for the reception of this improved one piece connecter.

Referring now to Sheet 2 covering Figures 5 to 9 inclusive, there is illustrated another form of cable box and connecter possessing substantially the same principles as hereinbefore described but varying in some respects in the structure thereof. This particular cable box comprises preferably a circular wall 30 embracing an integral web 31 carrying a threaded boss or fixture stud 32 to support electrical fixtures from the ceiling; and the web is made with knock-out openings 19 similar to those heretofore described for the reception of the cable end and connecters. The holes or openings 19 are peculiarly shaped and formed with an internal cam edge whereby a locking connecter sleeve placed therein is forcibly locked under the camming action of the opening. This cable box, whether made of cast iron or pressed steel, utilizes knock-out openings 19 which are cast in place and adapted to be knocked out with a tool, such as a hammer, or punched leaving the punched part in position and similarly adapted to be subsequently knocked out, thereby providing the said knock-out opening 19 for the reception of the cable and connecter. These knock-out openings are identical to those hereinbefore described and similarly possess the round edge 19 which runs off at a tangent forming a cam edge 20, and which edge then drops back on a line substantially radial with the axis of the hole to form a shoulder 21.

The sleeve connecter as shown in Figure 9 removed from the cable box 30 in order that its detail structure be clearly understood; and this connecter embodies a sleeve 33 on one end of which is formed a hexagonal wrench head 34, and at the other end of which is formed a cover flange 35 designed to cover over the box hole 19. A cable end shoulder 36 is made at the end of the sleeve and acts as a stop or a rest against which the cable end is placed. The sleeve is made hollow for the reception of the cable; and is transversely slotted, as at 25, which slot is preferably made alongside or adjacent the cover flange 35. The cam-follower 26 as hereinbefore described, is employed in this connecter for engagement with the cam edge 20. The connecter 33 loosely drops into the knockout opening 19 by sliding the cam-follower 26 into the large opening adjacent the shoulder 21 thereby bringing the slot 25 into alignment with the edge of the web 31 or the edge of the hole 19; and as the sleeve is rotated, the cam-follower 26 imparts a transversely sliding movement to the sleeve 33 which causes the said slot 25 to lap over the web, thereby bringing the web 31 into the slot 25.

In locking a cable C to the box with the connecter 33, the cable end is inserted in the sleeve and against the shoulder 36 whereupon the connecter and cable are placed in the knock-out opening 19, a wrench being then applied to the head 34 which is used to forcibly turn the connecter thereby causing the edge of the knock-out hole, or the edge 31 of the web, to bite and press into the wall of the cable, which very forcibly and securely holds the cable in the connecter, and similarly the box edge 31 holds the connecter within the box 30. The shoulder 21 made in the cable box knock-out acts as a stop against which the cam or rib 26 rests thereby preventing the mechanic from turning the connecter in the wrong direction, it being possible only to rotate the connecter in the one direction against the internal cam edge 20 thus effecting the locking and anchoring function as hereinbefore described.

Referring now more particularly to Sheet 3 embodying Figures 10 to 15 inclusively, I have illustrated another form of my invention possessing essential principles like those hereinbefore described, but varying slightly in construction thereby affording the manufacturer alternative forms.

The cable box 40 utilizes knockouts 41 provided in the same manner as hereinbefore described, excepting however they are round. A rib 42 is made adjacent each opening 41 and are thus placed to engage the sleeve connecter used in anchoring the cable to the box; and the connecter for use in combination with this box will now be described.

The sleeve connecter shown in Figure 14 is removed from the box to better show the construction thereof; and it is observed that the connecter embodies a sleeve 44 having a wrench end or head 45 on one end together with a cable stop bushing or shoulder 46. The other end of the sleeve carries a cam 47 sufficiently large to lap over and cover the edges defining the knockout 41 in the box, and sufficiently large to reach the rib 42 for engagement therewith. A slot 25 is made in this sleeve 44 in the same manner and for the same purpose as hereinbefore described and is formed adjacent the cam 47 to bring the cam in contact with the wall 43 of the cable box. The cam 47 performs the double purpose of covering the box knock-out hole at all times thereby providing a sealed box, and at the same time acts as a cam to force the parts into anchored position.

By placing an empty connecter 44, that is one not containing a cable end, within the knockout 41, and slightly rotating it, the cam is caused to engage the rib 42, thereby producing a camming action which causes the sleeve 44 to slide away from the center of the knockout and along the edge 43 until the said edge 43 of the cable box passes far into the slot 25 which attaches the connecter 44 to the cable box; and at the same time the cam 47, being sufficiently large, covers up that portion of the knockout opening 41 which is farthest removed from the cylindrical wall of the sleeve.

By now placing a cable C in the connecter, it is to be observed that it locks the cable in a manner similar to that hereinbefore described because the cable box wall edge 43 moves transversely into the slot 25 until it clamps, squeezes, or bites into the conduit or cable thereby establishing a firm grip which simultaneously anchors the connecter and cable to the box.

In Figure 15 there is illustrated another form of improved sleeve connecter eliminating the aforesaid slot 25 for use in conjunction with the foregoing outlet box 18 and 30 or any box utilizing the improved internal cam knock-out; and with slight modification thereof it is also intended for use with the box 40. This cable connecter comprises a sleeve 50 with a wrench head 51 made on one end thereof by which the connecter is forcibly turned in the knock-out opening of a cable box. The rib or cam-follower 26 or other suitable means may be employed here as previously described. This connecter is made with a substantially large box hole edge abutment notch forming a straight end shoulder or arcuate wall 52 at the end of the sleeve; and a partial flange or rim 54 is made at the end of the cam-follower 26 and at the end of the sleeve 50. The flange 54 covers the rim of the knock-out opening when the connecter is forcibly turned in the cable box to produce the locking action, for otherwise a slight space or opening might appear, but which is in this instance covered by the flange 54. The end shoulder 52 bears against one side of the cable box web 43 or 31 while the flange 54 bears against the opposite side of the web; and the cam follower 26 forces the connecter sidewise which causes the surface 52 and shoulder flange 54 to bind against the opposite surfaces of the box thereby anchoring the connecter to the box. This connecter shown in Figure 15 is similar to connecters heretofore described excepting that the slot 25 as employed in connecters earlier described is left out of this last described connecter to eliminate the machine slotting operation required to produce the slot.

From the foregoing description, it is seen among other features, that I have devised a cable connecter in the form of a sleeve or cable socket which is axially received into the box knock-out and is then forcibly displaced sidewise to fasten itself onto the box and cable by the slot grip locking means 25 or 52, and the equivalent thereof.

The cam and cam-follower means disclosed is simply an example of an operating means to forcibly move the cable or connecter, or move both the cable and connecter, in the box cable hole to attain the gripping action of the exposed box hole edge against the cable and simultaneously force the box hole edge to anchor itself in between the connecter abutments.

These boxes and connecters are designed to be manufactured so they may be sold separately or together to suit the requirements of the trade, thereby enabling, in many cases, other types of connecters to be used with my boxes.

What I claim is:

1. Cable and box connecting means comprising, a box provided with a hole, a member of such size as will fit into said hole, said member being provided with spaced means abutting the opposite box wall surfaces adjacent the hole to anchor the member in the box against longitudinal displacement and formed to expose a portion of the box hole edge directly to a cable placed therein, and said cable and box connecting means also including means cooperating with said member to grip a cable between said member and said exposed box hole edge.

2. Cable and box connecting means comprising, a box provided with a hole, a member of such size as will fit into said hole, said member being provided with spaced means adapted to abut the opposite box wall surfaces adjacent the hole to anchor the member in the box against longitudinal displacement and being formed to expose a portion of the box hole edge directly to a cable placed therein, and said cable and box connecting means also including means cooperating with said member to move it laterally relative to said box hole to grip a cable between said member and said exposed box hole edge.

3. Cable and box connecting means comprising, a box provided with a hole, a connecter including a sleeve, said connecter being of such size as will permit it to fit into said box hole, said connecter being provided with spaced means which abut the opposite box wall surfaces adjacent the hole to anchor the sleeve in the box against longitudinal displacement and formed to expose a portion of said box hole edge directly to a cable placed therein, and said cable and box connecting means also including means cooperating with said sleeve to grip a cable between the sleeve and exposed box hole edge.

4. Cable and box connecting means comprising, a box provided with a hole, a connecter including a sleeve, said connecter being of such size as will permit it to fit into said box hole, said connecter being provided with spaced means which abut the opposite box wall surfaces adjacent the hole to anchor the sleeve in the box against lengthwise displacement and formed to expose a portion of said box hole edge directly to a cable placed therein, and said cable and box connecting means also including means cooperating with said sleeve to force it laterally relative to said box hole to grip a cable between said sleeve and said exposed box hole edge.

5. Cable and box connecting means comprising, a box provided with a hole, a connecter including a sleeve, said connecter being of such size as will permit it to fit into said box hole, said sleeve being provided with a slot into which the box hole edge projects to anchor the sleeve in the box against longitudinal displacement and to directly expose said box hole edge inside the sleeve to a cable, and said cable and box connecting means including means cooperating with the sleeve to grip the cable between the exposed box hole edge and the sleeve.

6. Cable and box connecting means comprising, a box provided with a hole, a connecter including a sleeve, said connecter being of such size as will permit it to fit into said box hole, said sleeve being provided with a slot into which projects the box hole edge to anchor the sleeve in the box against displacement and to directly expose a portion of said box hole edge inside the sleeve to a cable placed therein, and said cable and box connecting means including means cooperating with the sleeve to forcibly move it laterally relative to the box to grip the cable against the exposed box hole edge.

7. Cable and box connecting means comprising, a box provided with a hole, a connecter member of such size as will fit into said hole, said connecter member including a sleeve, said connecter including means by which the box hole edge is left exposed inside the sleeve, spaced means on the connecter into which is seated a portion of the box hole edge, and said cable and box connecting means including means cooperating with the sleeve to grip a cable between the exposed box hole edge and said sleeve.

8. Cable and box connecting means comprising, a box provided with a hole, a connecter member of such size as will fit into said hole, said connecter member including a sleeve, said connecter including means by which the box hole edge is left exposed inside the sleeve, spaced means on the connecter into which is seated a portion of the box hole edge, and said cable and box connecting means including means cooperating with the connecter to forcibly move it laterally relative to the box thereby seating aforesaid a portion of the hole edge into the spaced means and forcing a portion of the exposed hole edge against a cable received into the box hole and connecter.

9. Cable and box connecting means comprising, a box provided with a hole, a connecter including a sleeve, said sleeve being of such size as will permit it to pass through said box hole and rest its end against one side of the box wall, said connecter including abutment means spaced from the end of the sleeve and larger than the box hole which prevents said abutment means from passing through the hole, a portion of the connecter joining together the sleeve and large abutment means and said portion extending through the box hole, said portion exposing a part of said box hole edge directly to a cable therein placed, and said cable box connecting means also including means cooperating with said connecter sleeve to grip a cable between said sleeve and the exposed box hole edge.

10. Cable and box connecting means comprising, a box provided with a hole, a connecter including a sleeve, said sleeve being of such size as will permit it to pass through said box hole and rest its end against one side of the box wall, said connecter including abutment means spaced from the end of the sleeve and larger than the box hole which prevents said abutment means from passing through the hole, a portion of the connecter joining together the sleeve and large abutment means and said portion extending through the box hole, said portion exposing a part of said box hole edge directly to a cable therein placed, and said cable and box connecting means also including means cooperating with said connecter sleeve to displace it laterally relative within the box hole to grip a cable between the sleeve and the exposed box hole edge.

11. Cable and box connecting means comprising, a box having a hole, a connecter of such size as will fit into the hole and having a projection extending through the box hole and against which seats a portion of the box hole edge leaving a portion of the edge exposed, shoulder means on the connecter abutting one side of the box wall, an abutment on the connecter spaced from the shoulder means and bearing against the other side of the box wall and of such size as will not permit it to pass through said box hole, and said cable and box connecting means also including means cooperating with the connecter to grip a cable between the connecter and the exposed box hole edge.

12. Cable and box connecting means comprising, a box having a hole, a connecter of such size as will fit into the hole, a connecter moving projection extending through the box hole and against which seats a portion of the box hole edge but leaving a portion of the box hole edge exposed, shoulder means on the connecter abutting one side of the box wall, an abutment integral with the connecter spaced from the shoulder means and bearing against the other side of the box wall and of such size as will not permit it to pass through said box hole, and said cable and box connecting means including means cooperating with said connecter to move it laterally relative to the box hole to grip a cable between the connecter and the exposed box hole edge.

13. Cable and box connecting means comprising a box provided with a hole, a member of such size as will fit into said hole, said member being provided with spaced means abutting the opposite box wall surfaces adjacent the hole to anchor the member in the box against longitudinal displacement and formed to expose a portion of the box hole edge directly to a cable therein placed, and said cable and box connecting means also including means comprising a portion on said member operatively bearing against the box to force the member laterally relative to the box hole to grip the cable between the exposed box hole edge and member.

14. Cable and box connecting means comprising, a box provided with a hole, a connecter including a sleeve, said connecter being of such size as will permit it to fit into said box hole, said connecter being provided with spaced means into which is received a portion of the box hole edge to anchor the sleeve in the box against lengthwise movement and formed to expose a portion of said box hole edge directly to a cable therein placed, and said cable and box connecting means also including means comprising a portion on said member operatively bearing against the box to force said sleeve laterally relative to the box hole to grip a cable between the exposed box hole edge and sleeve.

15. Cable and box connecting means comprising, a box having a hole, a connecter of such size as will fit into said hole, said connecter being provided with spaced means abutting the opposite box wall surfaces adjacent the hole to anchor the connecter in the box against longitudinal displacement and formed to expose a portion of the box hole edge directly to a cable placed therein, and said cable and box connecting means also including means cooperating with the edge of the box hole to move the connecter laterally relative to the box hole, to grip a cable between the exposed box hole edge and connecter.

16. Improvements in combination fixture boxes and cable connecters comprising, a box having a cam-shaped hole, a connecter fitting in the hole and adapted to receive a cable, said connecter being provided with a box hole edge entry slot which receives the box hole edge and a cam-follower engaging the cam-shaped box hole edge to move the connecter laterally to grip a cable between the connecter and the box hole edge.

17. Improvements in combination fixture boxes and cable connecters comprising, a box having a cam-shaped hole, a sleeve rotatable in said hole, said sleeve having a box hole edge entry slot through which a portion of the edge of the cam-shaped box hole projects, a cam-follower moving against the edge of the box hole, and a tool receiving means by which the cam-follower is rotated to force the box hole edge through the slot.

18. A combination box and connecter as defined in claim 16 but characterized by a stop which is made a part of the cam-shaped box hole by which the connecter is restrained from being turned in the wrong direction.

19. A connecter comprising a member of such a size as will fit into a box hole, said member being provided with spaced means adapted to abut the opposite box wall surfaces adjacent the hole to anchor the member in the box against longitudinal displacement and formed to expose a portion of the box hole edge directly to a cable therein placed, said spaced means also including a projection adapted to cooperate with a box to move said member laterally when turned and a part which is larger than the box hole, said member also being provided with a tool receiving means by which it is turned.

20. A connecter as defined in claim 19 in which the tool receiving means is formed on the larger part.

21. A connecter comprising, a sleeve provided with a transverse slot, a sleeve moving projection, and a tool receiving means by which it is turned.

22. A connecter comprising, a sleeve provided with a transverse slot, a tool receiving means on the sleeve by which it is turned, and a cam-follower on the sleeve.

23. A connecter comprising, a sleeve having a slot, a tool receiving means at one end of the sleeve, and a cam-follower on the sleeve.

24. A connecter comprising, a sleeve having a slot, a tool receiving means on the sleeve adjacent the slot and forming one edge thereof, and a cam-follower on the sleeve.

25. A connecter comprising, a sleeve having a transverse slot, a shoulder opposite the slot, a tool receiving means defining one edge of the slot, and a sleeve moving projection.

26. A connecter comprising a member of such size as will fit into a box hole, said member including spaced parts adapted to abut opposite box wall surfaces adjacent a box hole to anchor the member in the box against longitudinal displacement and formed to expose a portion of a box hole edge directly to a cable placed therein, said spaced parts also including means adapted to force said member laterally when said means is moved against and in respect to a box hole edge in the application of the connecter to the box to grip the cable between the member and the exposed box hole edge.

27. A connecter as defined in claim 26 in which one of said spaced parts is too large to pass through a box hole.

28. Cable and box connecting means comprising, a box provided with a cam-shaped cable and connecter receiving hole embodying a circular edge, a tangent curve leading off from the circular edge forming a cam edge box hole, and a radial edge joining the outer end of the cam edge and extending radially inwardly toward the centre of the box hole to form a stop.

29. Cable and box connecting means comprising, a box provided with a cam-shaped cable and connecter receiving hole embodying a circular edge, a tangent curve leading off from the circular edge forming a cam edge box hole, an edge joining the outer end of the cam edge and extending substantially radially inwardly toward the centre of the box hole to form a stop to limit movement of a connecter, a sleeve having a slot into which projects said box hole edge, a tool receiving means on the sleeve, and a cam-follower on the sleeve turning in engagement with said cam-shaped box hole.

30. Cable and box connecting means comprising, a box having a cable and connecter receiving hole, a connecter member of suitable size to fit into the box hole and formed to expose a portion of said box hole edge directly to the cable and including spaced abutment means between which is placed the box hole edge to anchor the member in the box hole against longitudinal displacement; and said cable and box connecting means also including means, operative after the box hole edge is placed in position between said spaced abutment means; to grip the cable between said member and said exposed box hole edge.

31. Cable and box connecting means as defined in claim 30 wherein the connecter comprises a sleeve-like member formed to expose a portion of the box hole edge.

32. A cable and box connecting means as defined in claim 30 wherein the connecter comprises a sleeve-like member having a transverse entry slot to receive the box hole edge thereby exposing said edge to a cable received into the sleeve and which slot also is included as abutment means.

33. Cable and box connecting means comprising, a box having a cable and connecter receiving hole, a connecter member of suitable size to fit into the box hole and formed to expose a portion of said box hole edge directly to the cable and including spaced abutment means between which is placed the box hole edge to anchor the member in the box hole against longitudinal displacement; and said cable and box connecting means also including means, operative after the box hole edge is placed in position between said spaced abutment means; to move at least a portion of said cable and box connecting means laterally relative to said box hole to grip the cable between said member and said exposed box hole edge.

34. A cable and box connecting means as defined in claim 33 wherein the connecter comprises a sleeve-like member having a transverse entry slot to receive the box hole edge thereinto and against the cable.

In testimony whereof I affix my signature this 29th day of November 1922, in the city of New York, State of New York, and county of New York.

HERMAN L. STRONGSON.